United States Patent [19]

Kohda et al.

[11] Patent Number: 5,129,038

[45] Date of Patent: Jul. 7, 1992

[54] NEURAL NETWORK WITH SELECTIVE ERROR REDUCTION TO INCREASE LEARNING SPEED

[75] Inventors: Toshiyuki Kohda, Takatsuki; Yasuharu Shimeki, Suita; Shigeo Sakaue, Takarazuka; Hiroshi Yamamoto, Nishinomiya, all of Japan

[73] Assignee: Matsushita Electric Industrial Co., Ltd., Osaka, Japan

[21] Appl. No.: 481,316

[22] Filed: Feb. 20, 1990

[30] Foreign Application Priority Data

Feb. 23, 1989 [JP] Japan .................................. 1-43731
Aug. 4, 1989 [JP] Japan ................................. 1-203326

[51] Int. Cl.⁵ .............................................. G06F 15/18
[52] U.S. Cl. .................................................... 395/23
[58] Field of Search ........................... 364/513; 395/23

[56] References Cited

U.S. PATENT DOCUMENTS 3,601,811 8/1971 Yoshino ............................... 364/200
4,912,649 3/1990 Wood ................................... 364/513
4,912,654 3/1990 Wood ................................... 364/513

FOREIGN PATENT DOCUMENTS

WO88/07234 9/1988 PCT Int'l Appl. .

OTHER PUBLICATIONS

D. E. Rumelhart, G. E. Hinton and R. J. Williams: "Learning Representations by Back-Propagating Errors", Nature, vol. 323, pp. 533–536, Oct. 9, 1986.

Lippmann, "An Introduction to Computing with Nueral Nets", IEEE Acoustics, Speech, and Signal Processing Magazine, pp. 4–22, Apr. 1987.

Widrow, "Punish/Reward: Learning with a Critic in Adaptive Threshold Systems", IEEE Transactions on Systems, Man and Cybernetics, vol. SMC3, No. 5, pp. 455–465, Sep. 1973.

Primary Examiner—Allen R. MacDonald
Attorney, Agent, or Firm—Stevens, Davis, Miller & Mosher

[57] ABSTRACT

An improved iterative learning machine having a plurality of multi-input/single-output signal processing units connected in a hierarchical structure includes a weight coefficient change control unit which controls weight change quantities for those multi-input/single-output signal processing units having iteratively reduced errors thereby increasing the learning speed, contrary to conventional learning machines which perform a learning operation in order to minimize a square error of multi-input/single-output signal processing units in the highest hierarchy of the hierarchical structure.

11 Claims, 9 Drawing Sheets

NEURAL NETWORK WITH SELECTIVE ERROR REDUCTION TO INCREASE LEARNING SPEED

BACKGROUND OF THE INVENTION

1. Field of the Invention

The present invention relates to learning machines in which a plurality of multi-input/single-output signal processors of a data processor are connected in a hierarchical structure.

2. Description of the Related Art

A conventional learning machine is disclosed, for example, in D. E. Rumelhart, G. E. Hinton and R. J. Williams "Learning Representations by Back-Propagating Errors", NATURE, Vol. 323, pp. 533 – 536, Oct. 9, 1986. As shown in FIG. 9, this machine comprises an output signal computing unit and a weight coefficient updating unit. The output signal computing unit has a hierarchical structure having a plurality of multi-input/single-output signal processing units 600 connected to form a network with no mutual coupling between respective processing units 600 of the same hierarchy so that signals are propagated only in the direction of a higher hierarchy. Any particular multi-input/single-output signal processing unit 600 functions to form an output value thereof through a conversion process using a threshold function to be performed on a total sum of the products of outputs from respective multi-input/single-output signal processing units 600 of a lower hierarchy connected to the particular multi-input/single-output signal processing unit 600 and weight coefficients indicative of the respective degrees of connection therebetween and then to transmit the output value to a higher hierarchy multi-input/single-output signal processing unit 600. In the weight coefficient updating unit, a teacher signal generator 602 responds to signals inputted to input units 601 of the output signal computing unit to generate a teacher signal $t_k$ as a desired output signal for the inputted signals. An error signal computing unit 603 computes a square error given by $$E = 0.5 \sum_k (t_k - o_k)^2$$

thus using a difference between the teacher signal $t_k$ and an actual output signal $o_k$ (indicative of an output value of the highest-hierarchy k-th multi-input/single-output signal processing unit in the output signal computing unit) from the output signal computing unit, and evaluates the performance of the network under the current state of connection (represented by the magnitude of the weight coefficients) in accordance with the resulting value of the square error. A weight change quantity computing unit 604 calculates weight change quantities $\Delta w_{ij}$ for the weight coefficients of the output signal computing unit on the basis of the calculated error E by using the following formula:

$$w_{ij} = -\epsilon \cdot \delta E/\delta w_{ij}$$

where $\epsilon$ is a positive constant called a learning rate. By repeating the updating of the weight coefficients as mentioned above, the error is reduced gradually to have a sufficiently small value, at which time the learning is ended by regarding that the output signal has become sufficiently close to a desired value.

With such a conventional learning machine, learning is performed such that the total sum of the square errors E is minimized. Therefore, even if any multi-input/single-output signal processing unit 600 involving a large error remains, error reducing operations are performed by changing the weights for all the multi-input/single-output signal processing units including units which involve sufficiently small errors, and, when the total sum of the square error E is reduced, the weights are changed regardless of any other conditions, even if such a multi-input/single-output signal processing unit involving a large error still remains. Therefore, the minimization of the total sum of the square errors does not necessarily cause a change of the weight to be made so as to reduce an error of the processing unit involving a large error, so that there occurs a case that only the errors involved in a certain multi-input/single-output signal processing unit in the highest hierarchy remain very large without being converged. Thus, in the prior art learning machine, learning requires much time.

Further, there has been another problem that, when the square error E is reduced, the weight coefficients of multi-input/single-output signal processing units involving even a sufficiently reduced error are updated, so that the efficiency of learning is degraded and the time required for learning becomes long.

SUMMARY OF THE INVENTION

It is therefore an object of the present invention to provide a learning machine which requires a reduced time for the learning operation.

In order to achieve the object, the present invention provides an iterative learning machine comprising:

an output signal computing unit which comprises a plurality of multi-input/single-output signal processing units connected to form a network of a hierarchical structure so that the multi-input/single-output signal processing units in each hierarchy have no mutual coupling therebetween and signals propagate only in the direction of a higher hierarchy; and a weight coefficient updating unit for updating weight coefficients for the output signal computing unit on the basis of an output signal from the output signal computing unit;

wherein each of the multi-input/single-output signal processing units comprises:

a memory for storing a plurality of weight coefficients;

a plurality of input units for receiving a plurality of data;

multiplying means for weighting input data from the input units by using the weight coefficients stored in the memory;

adder means for adding together the plurality of data weighted by the multiplying means;

a threshold value processing unit for limiting an output from the adder means to a value within a predetermined range; and wherein the weight coefficient updating unit comprises:

supervisory signal generator for generating a reference signal as a desired value for the output signal from the output signal computing unit;

an error signal computing unit for computing an error between the output signal from the output signal computing unit and the teacher signal;

a weight change quantity computing unit for computing weight change quantities for the weight coefficients stored in the memory in accordance with an output from the error signal computing unit; and a weight coefficient change quantity control unit for controlling change quantities for the weight coefficients stored in the memory in accordance with an output of the error signal computing unit.

DESCRIPTION OF THE PREFERRED EMBODIMENTS

Embodiments of the present invention will be described with reference to the accompanying drawings.

Figure 1:
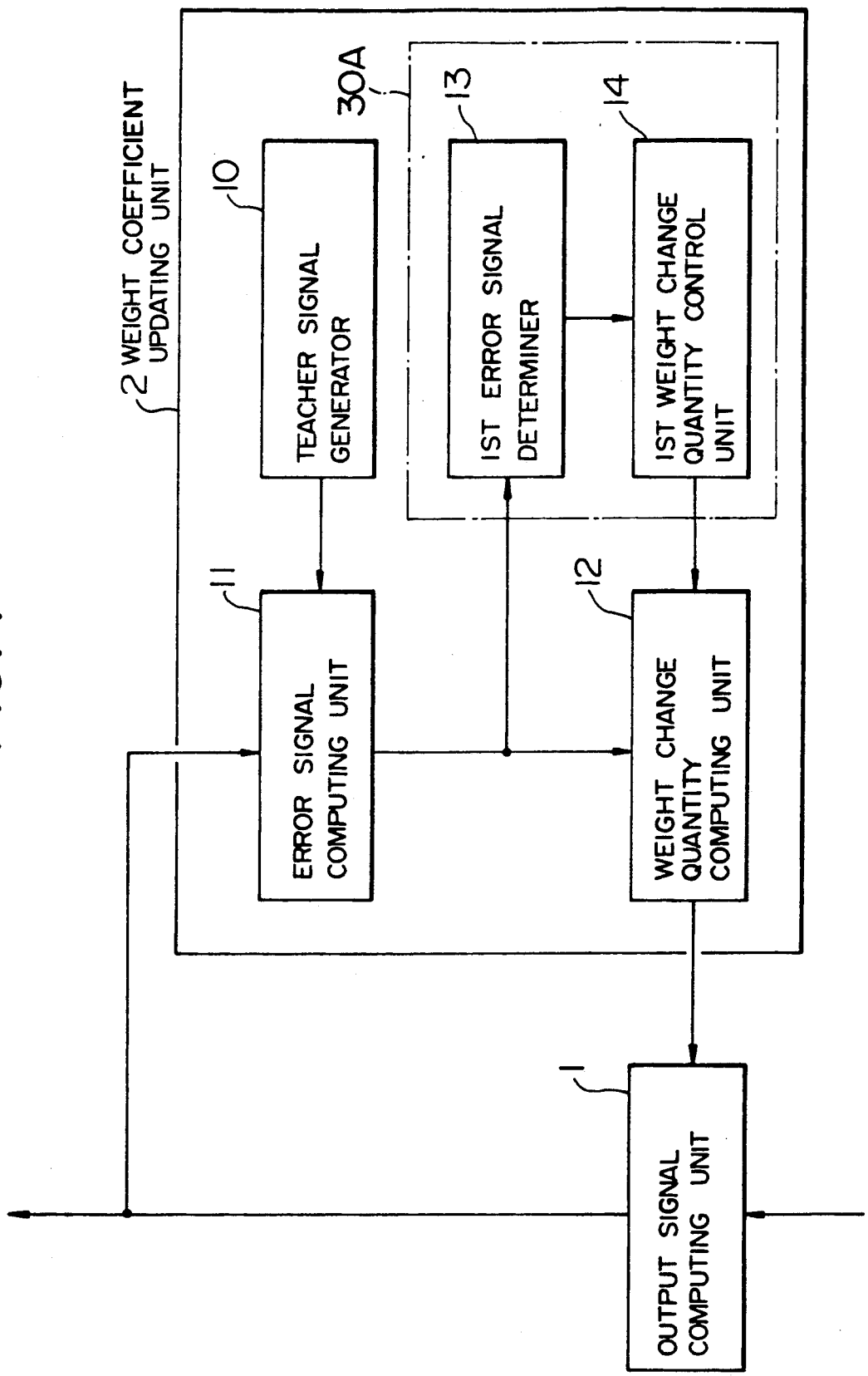
FIG. 1 is a structural diagram showing a learning machine of a first embodiment of the present invention.
Figure 2:
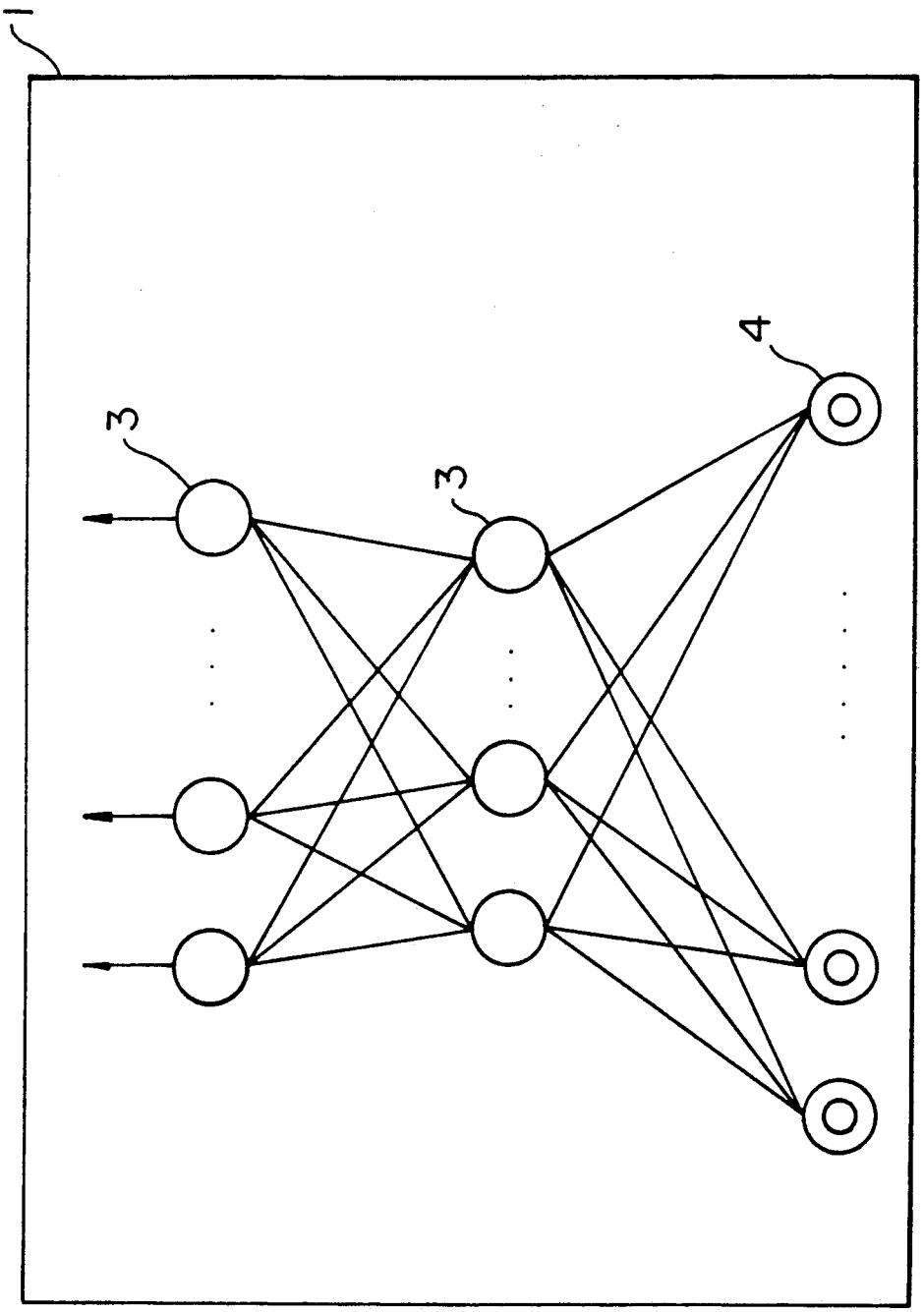
FIG. 2 is a structural diagram showing an output signal computing unit of the first embodiment.
Figure 3:
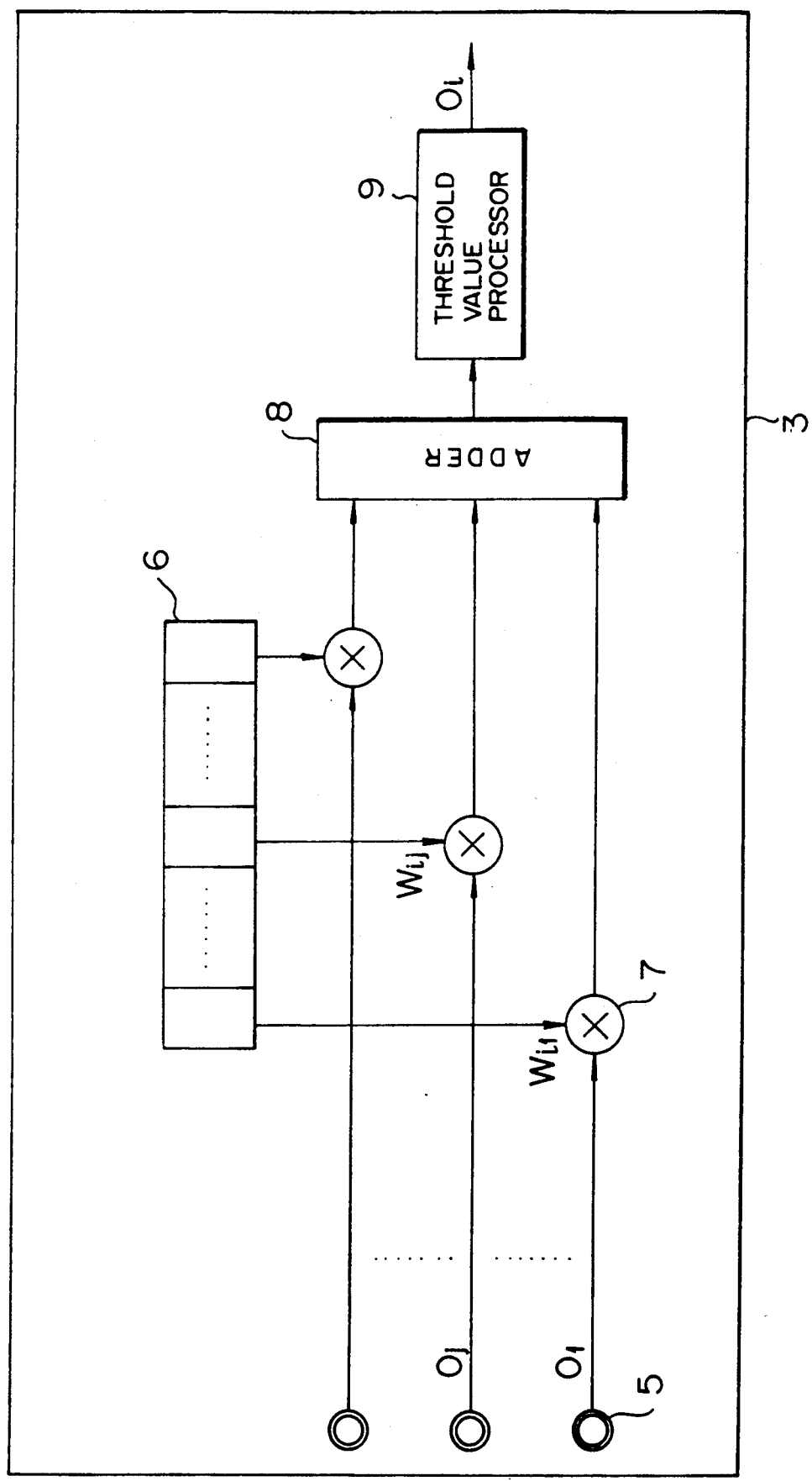
FIG. 3 is a structural diagram showing a multi-input/single-output signal processing unit of the first embodiment.
Figure 4:
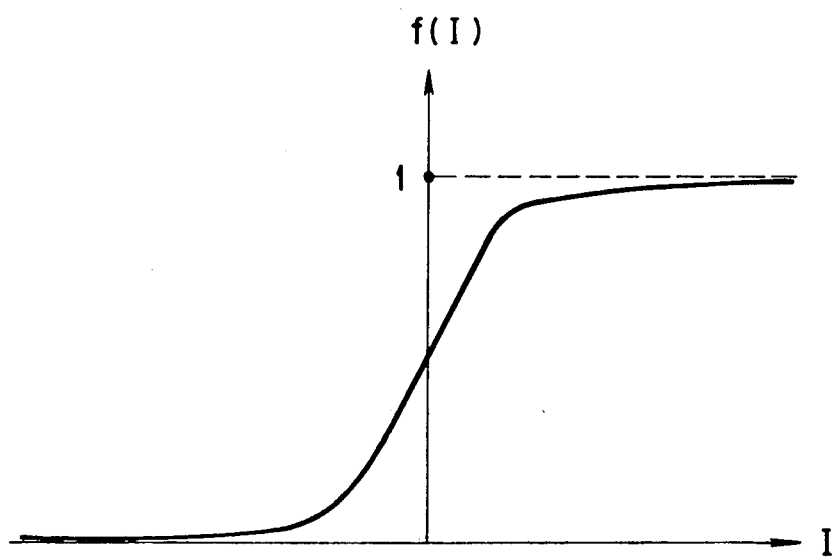
FIG. 4 is a characteristic diagram showing an input-output characteristic of a threshold value processor of the first embodiment.

FIG. 1 is a structural diagram showing a learning machine of a first embodiment of the present invention. In FIG. 1, reference numeral 1 denotes an output signal computing unit, and 2 a weight coefficient updating unit for updating values of weight coefficients for the output signal computing unit 1 by using output signals from the output signal computing unit 1. The output signal computing unit 1 has a hierarchical structure as shown in FIG. 2. Reference numeral 3 denotes multi-input/single-output signal processing units, and 4 input units of the output signal computing unit 1. FIG. 3 specifically illustrates the structure of each of the multi-input/single-output signal processing units 3 of the output signal computing unit 1. In FIG. 3, reference numeral 5 denotes input units of each multi-input/single-output signal processing unit 3, 6 a memory for storing weight coefficients with which a plurality of corresponding inputs from the input units 5 are weighted, 7 multipliers for multiplying the inputs from the input units 5 by corresponding weight coefficients from the memory 6, 8 an adder for adding together outputs from the multipliers 7, 9 a threshold value processor which limits an output from the adder 8 to a value within a predetermined range. The input-outout characteristic of the threshold value processor 9 is shown in FIG. 4. For example, the input-output characteristic of the threshold value processor 9 which limits the output of the adder to a value within the range (0, 1) is given by the following mathematical expression:

$$f(I) = 1/(1 + \exp(-I + \theta))$$

where I shows an input to the threshold value processor 9. The input-output characteristic of the threshold value processor 9 may be a threshold value function other than that mentioned above. Further, FIG. 1 illustrates a structure of the weight coefficient updating unit 2. Reference numeral 10 denotes a teacher signal generator, 11 an error signal computing unit, 12 a weight change quantity computing unit, 30A a weight coefficient change quantity control unit, 13 a first error signal determiner, and 14 a first weight change control unit.

The operation of the learning machine of the first embodiment constructed as above will be described hereunder. When the input units 4 of the output signal computing unit 1 receive input signals, in each of the multi-input/single-output signal processing units 3, the multipliers 7 multiply outputs of lower hierarchical multi-input/single-output signal processing units 3 connected to this multi-input/single-output signal processing unit 3 by corresponding weight coefficients indicative of respective degrees of connection therebetween which are stored in the memory 6. The adder 8 calculates a sum of respective outputs of the multipliers 7. The threshold value processor 9 converts the sum to an output value, which is then supplied to a higher-hierarchy multi-input/single-output signal processing unit. In more detail, each multi-input/single-output signal processing unit 3 shown in FIG. 3 performs the following calculation:

$$o_i = f\left(\sum_j w_{ij} o_j\right)$$

where $o_j$ is an input value (that is, an output of the j-th multi-input/single-output signal processing unit in a lower hierarchy) to an input unit 5, and $w_{ij}$ is a corresponding weight coefficient stored in the memory 6 (that is, a weight of coupling between the present i-th multi-input/single-output signal processing unit and the j-th multi-input/single-output signal processing unit in the lower hierarchy).

FIG. 4 illustrates an example of the input-output characteristics of the function f which represents a threshold processing performed by the threshold value processor 9 in a multi-input/single output signal processing unit 3.

The supervisory generator 10 generates a, reference signal $t_k$ as a desired output signal for each of the input signals to the input units 4 of the output signal computing unit 1 in response to the inputting of such input signals. The error signal computing unit 11 computes a sum of square errors of the highest-hierarchy multi-input/single-output signal processing unit as given by $$E = 0.5 \sum_k (t_k - o_k)^2$$

from a difference between the reference signal and an actual output signal ok outputted from the output signal computing unit 1. The error signal computing unit 11 outputs a signal indicative of the difference $(t_k - o_k)$ between the reference signal $t_k$ and the output signal $o_k$, which is necessary for changing the weight, to the weight change quantity computing unit 12. Here, the value of the reference signal $t_k$ assumes either zero or one, and the magnitude of $|t_k - o_k|$ varies within the range from zero to one. The weight change quantity computing unit 12 calculates change quantities $\Delta w_{ij}$ for the weight coefficients stored in the memory 6 of the output signal computing unit 1 on the basis of the error E thus computed, by using the following equation:

$$\Delta w_{ij} = -\epsilon \partial E / \partial w_{ij}$$

where $\epsilon$ is a positive constant called a learning rate. When the first error signal determiner 13 determines that an error $|t_k - o_k|$ is larger than a preset threshold value T1, the first weight change quantity control unit 14 multiplies change quantities for the weight coefficients in the highest hierarchy of the output signal computing unit 1 by a factor m. Since the weight changing is inhibited when the value of $|t_k - o_k|$ exceeds $\frac{1}{3}$, the threshold value T1 may be set to $\frac{1}{3}$, for example.

In this way, the error is iteratively reduced by repeating the updating of the weights, and, when the error becomes sufficiently small, the learning is ended by regarding that the output signal from the output signal computing unit 1 has become sufficiently close to a desired value.

As described above, according to this first embodiment, since the weight coefficients of a multi-input/single-output signal processing unit involving a large error are changed positively, it is possible to make the multi-input/single-output signal processing unit involving a large error converge rapidly, thereby reducing a time required for performing the learning.

Figure 5:
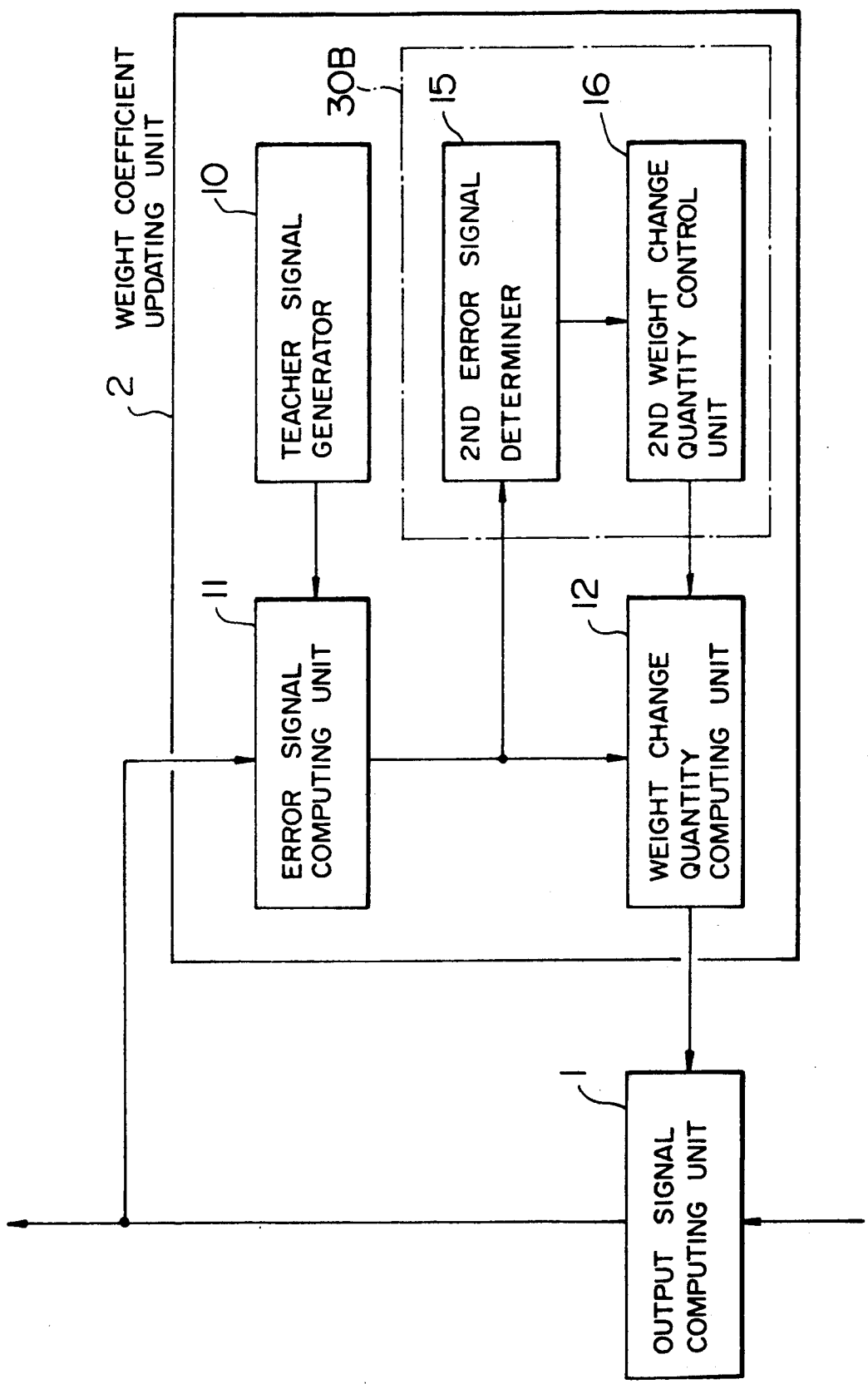
FIG. 5 is a structural diagram showing a learning machine of a second embodiment of the present invention.

FIG. 5 is a structural diagram showing a learning machine of a second embodiment of the present invention. Reference numeral 10 denotes a supervisory signal generator, 11 an error signal computing unit, 12 a weight change quantity computing unit, 30B a weight coefficient change quantity control unit, 15 a second error signal determiner, and 16 a second weight change quantity control unit.

The operation of the learning machine of the second embodiment of the present invention will be described hereunder. Similarly to the first embodiment, the output signal computing unit 1 supplies an output signal to the weight coefficient updating unit 2 in response to input signals thereto. The error signal computing unit 11 of the weight coefficient updating unit 2 computes a square error E. The weight change quantity computing unit 12 computes changes quantities for the weight coefficients on the basis of the error E. When the second error signal determiner 15 determines that an error $|t_k - o_k|$ is smaller than a set threshold value T2, the second weight change quantity control unit 16 changes to zero change quantities for the weight coefficients in the highest hierarchy in the output signal computing unit 1.

In this way, the error is, iteratively reduced by repeating the updating of the weights, and, when the error becomes sufficiently small, the learning is ended by regarding that the output signal from the output signal computing unit 1 has become sufficiently close to a desired value.

As described above, according to this second embodiment, since the weights for a multi-input/single-output signal processing unit involving a sufficiently small error are not changed, it is possible to improve the learning efficiency and to reduce a time required for perfoximing the learning.

Figure 6:
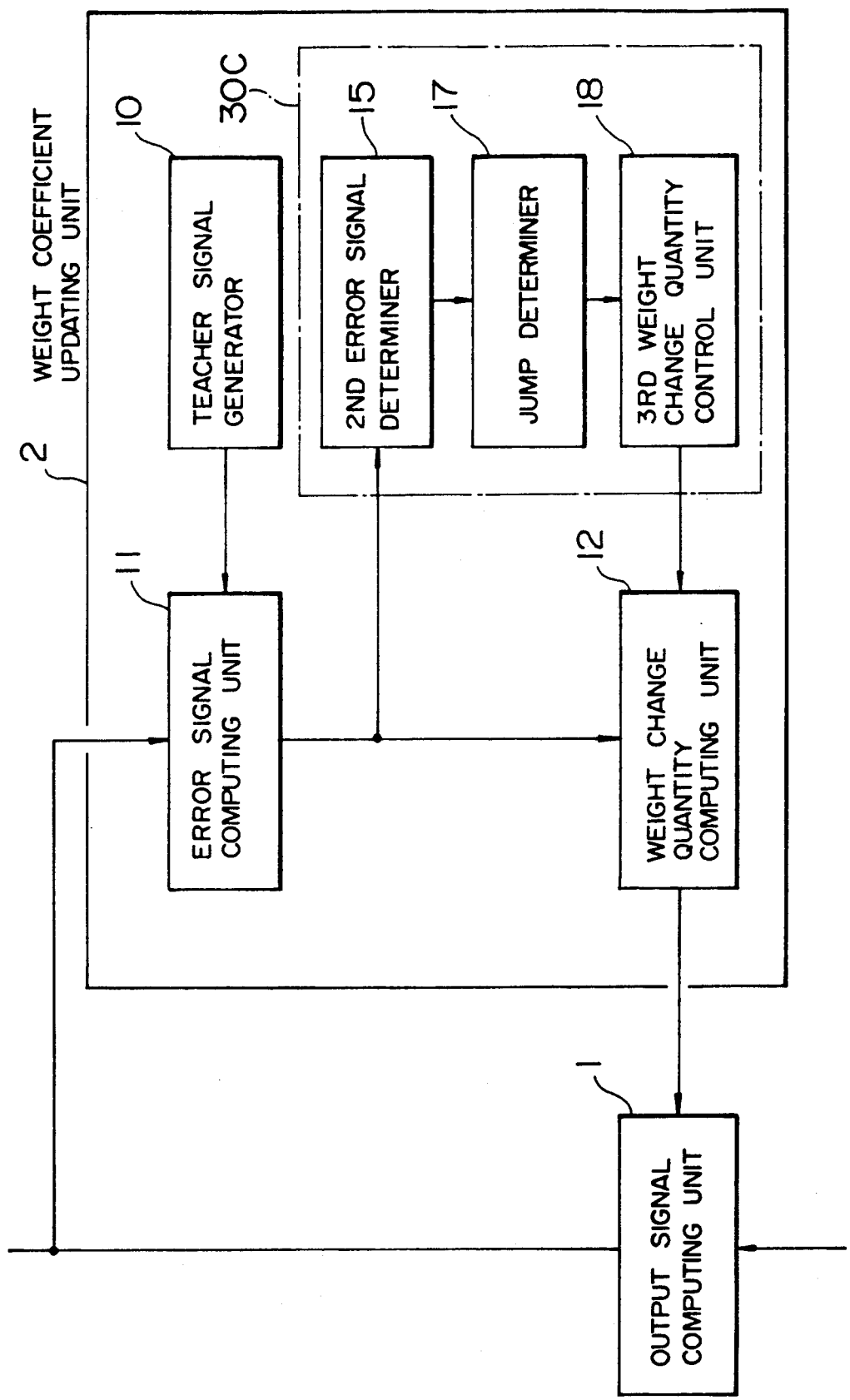
FIG. 6 is a structural diagram showing a learning machine of a third embodiment of the present invention.

FIG. 6 is a structural diagram showing a learning machine of a third embodiment of the present invention. Reference numeral 10 denotes a supervisory signal generator, 11 an error signal computing unit, 12 a weight change quantity computing unit, 30C a weight coefficient change quantity control unit, 15 a second error signal determiner, 17 a jump determiner, and 18 a third weight change quantity control unit.

The operation of the learning machine of the third embodiment of the present invention will be described hereunder. Similarly to the first embodiment, the output signal computing unit 1 supplies an output signal to the weight coefficient updating unit 2 in response to input signals thereto. The error signal computing unit 11 of the weight coefficient updating unit 2 computes a square error E. The weight change quantity computing unit 12 computes change quantities for the weight coefficients on the basis of the error E. The second error signal determiner 15 checks whether an error $|t_k - o_k|$ is smaller than a preset threshold value T3. If the second error signal determiner 15 determines that the error is larger than the preset threshold value T3, it outputs zero to the jump determiner 17, while, if the second error signal determiner 15 determines that the error is smaller than the preset threshold value T3, it outputs 1 to the jump determiner 17. The jump determiner 17 counts the results of the determination of the second error signal determiner 15 and outputs a jump signal when the errors $|t_k - o_k|$ of all the multi-input/single-output signal processing units in the highest hierarchy are smaller than the preset threshold value T3. When the jump determiner 17 generates a jump signal, the third weight change quantity control unit 18 controls to skip the weight changing operation of the weight change quantity computing unit 12.

In this way, the error is iteratively reduced by repeating the updating of the weights, and, when the error becomes sufficiently small, the learning is ended by regarding that the output signal from the output signal computing unit 1 has become sufficiently close to a desired value.

As described, according to this third embodiment, when errors of all the multi-input/single-output signal processing units 3 have been reduced sufficiently, the weight changing operation of the weight change quantity computing unit 12 is skipped. As a result, not only the learning efficiency is improved, but also the computation quantity is greatly reduced, thereby reducing a time necessary for performing the learning.

Figure 7:
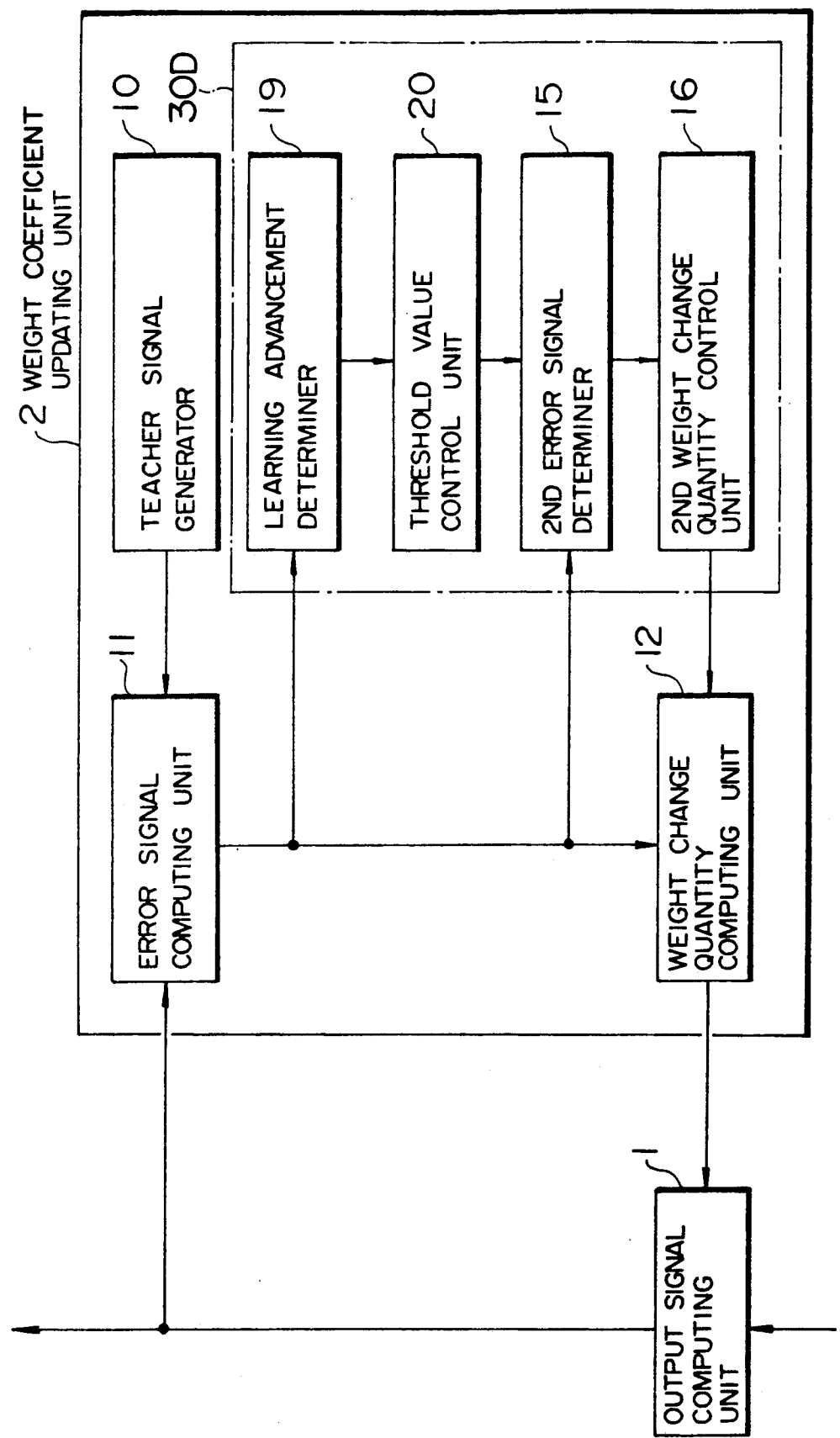
FIG. 7 is a structural diagram showing a learning machine of a fourth embodiment of the present invention.

FIG. 7 is a structural diagram showing a learning machine of a fourth embodiment of the present invention. Reference numeral 10 denotes a supervisory generator, 11 an error signal computing unit, 12 a weight change quantity computing unit, 30D a weight coefficient change quantity control unit, 15 a second error signal determiner, 16 a second weight change quantity control unit, 19 a learning advancement determiner, and 20 a threshold value control unit.

The operation of the learning machine of the fourth embodiment of the present invention will be described hereunder. Similarly to the first embodiment, the output signal computing unit 1 supplies an output signal to the weight coefficient updating unit 2 in response to input signals thereto. The error signal computing unit 11 of the weight coefficient updating unit 2 computes a square error E. The weight change quantity computing unit 12 computes change quantities for the weight coefficients on the basis of the error E. When the second error signal determiner 15 determines that an error $|t_k - o_k|$ is smaller than a threshold value T2 set by the threshold value control unit 20, the second weight change quantity control unit 16 changes to zero change quantities for the weight coefficients in the highest hierarchy in the output signal computing unit 1. As the learning advances, the threshold value control unit 20 changes the threshold value T2 to a smaller value on the basis of the result of the determination by the learning advancement determiner 19. In this case, the determination of the degree of advancement of the learning by the learning advancement determiner 19 may include the determination on the basis of the total sum of errors of the multi-input/single-output signal processing units 3 in the highest hierarchy in the output signal computing unit 1, the determination by the number of times of learning, the determination by the number of multi-input/single-output signal processing units in the highest hierarchy in the output signal computing unit 1, which units output errors exceeding the threshold value T2, or the determination by a maximum output value produced by the error signal computing unit 11 in a single time of learning.

In this way, the error is reduced iteratively by repeating the updating of the weights, and, when the error becomes sufficiently small, the learning is ended by regarding that the output signal from the output signal computing unit 1 has become sufficiently close to a desired value.

As described above, according to this fourth embodiment, since the weights for the multi-input/single-output signal processing units 3 involving errors smaller than the threshold value T2 are not changed, the learning efficiency can be improved, and a time necessary for performing the learning can be reduced. Besides, by reducing the magnitude of the threshold value T2 as the learning advances, it is possible to make the output $o_k$ of the output signal computing unit 1 approach more closely the reference signal $t_k$, thereby improving the precision of the learning.

Figure 8:
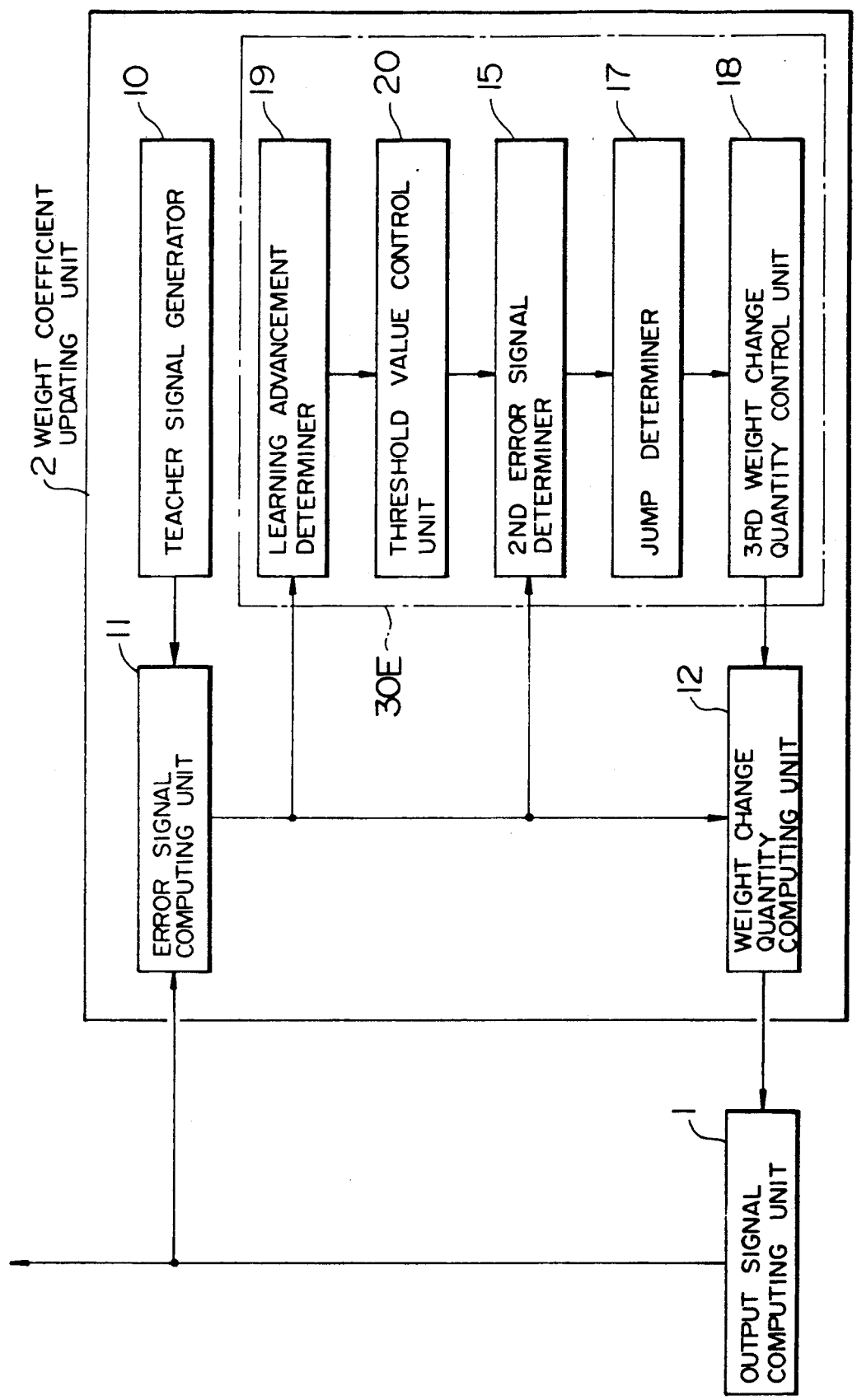
FIG. 8 is a structural diagram showing a learning machine of a fifth embodiment of the present invention.
Figure 9:
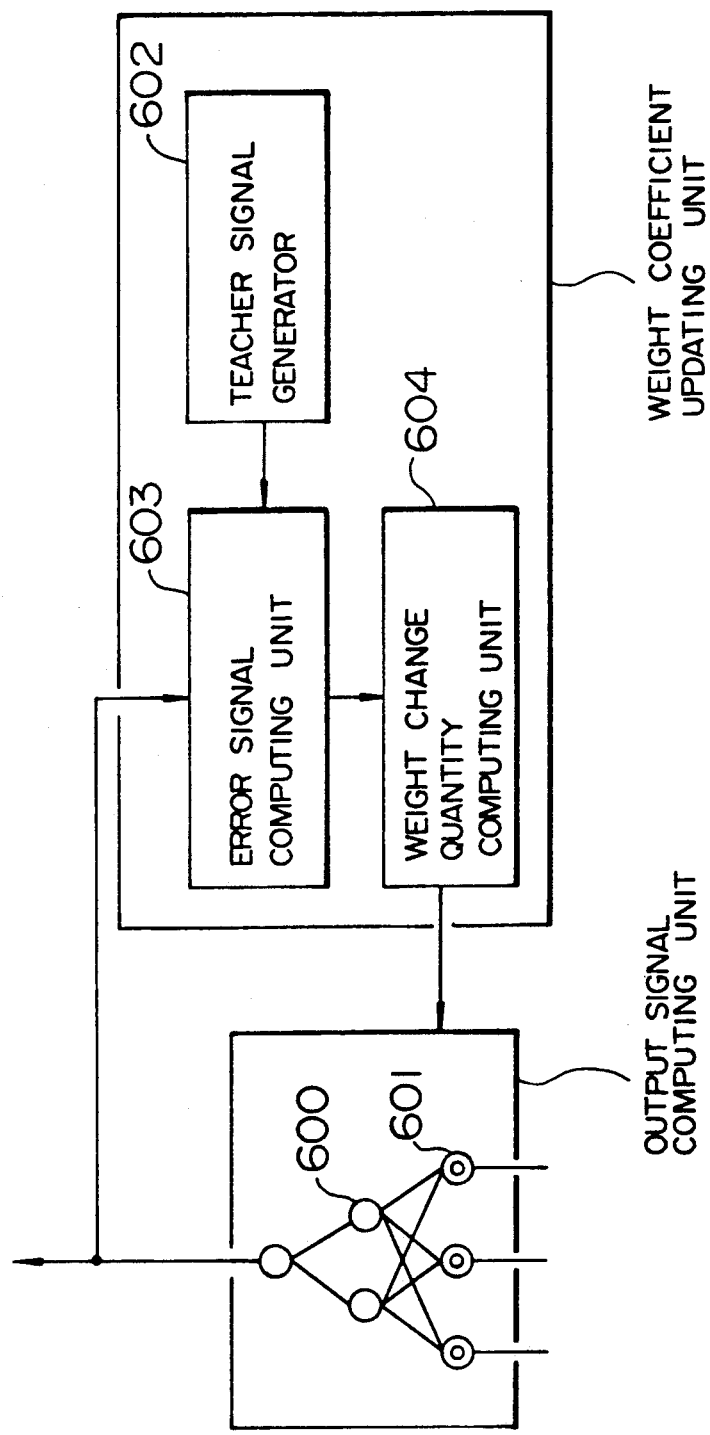
FIG. 9 is a structural drawing showing a conventional learning machine.

FIG. 8 is a structural diagram showing a learning machine of a fifth embodiment of the present invention. Reference numeral 10 denotes a supervisory signal generator, 11 an error signal computing unit, 12 a weight change quantity computing unit, 30E a weight coefficient change quantity control unit, 15 a second error signal determiner, 17 a jump determiner, 18 a third weight change quantity control unit, 19 a learning advancement determiner, and 20 a threshold value control unit.

The operation of the learning machine of the fifth embodiment of the present invention will be described hereinbelow. Similarly to the first embodiment, the output signal computing unit 1 supplies an output signal to the weight coefficient updating unit 2 in response to input signals thereto. The error signal computing unit 11 of the weight coefficient updating unit 2 computes a square error E. The weight change quantity computing unit 12 computes change quantities for the weight coefficients on the basis of the error E. The second error signal determiner 15 checks whether the error $|t_k - o_k|$ is smaller than a threshold value T3 set by the threshold value control unit 20. If the second error signal determiner 15 determines that the error is larger than the threshold value T3, the second error signal determiner 15 outputs zero to the jump determiner 17, while, if the second error signal determiner 15 determines that the error is smaller than the threshold value T3, it outputs one to the jump determiner 17. The jump determiner 17 counts the results of the determination of the second error signal determiner 15 and outputs a jump signal, when the errors $|t_k - o_k|$ of all the multi-input/single-output signal processing units in the highest hierarchy in the output signal computing unit 1 do not exceed the threshold value T3. When the jump determiner 17 outputs a jump signal, the third weight change quantity control unit 18 controls to skip the weight changing operation of the weight change quantity computing unit 12. In this case, as the learning advances, the threshold value control unit 20 changes the threshold value T3 to a smaller value on the basis of the result of the determination by the learning advancement determiner 19. In this case, the determination of the degree of advancement of the learning by the learning advancement determiner 19 may include the determination on the basis of the total sum of errors of the multi-input/single-output signal processing units 3 in the highest hierarchy in the output signal computing unit 1, the determination by the number of times of learning, the determination by the number of multi-input/single-output signal processing units in the highest hierarchy in the output signal computing unit 1, which units output errors exceeding the threshold value T3, or the determination by a maximum output value produced by the error signal computing unit 11 in a single time of learning.

In this way, the error is reduced iteratively by repeating the updating of the weights, and, when the error becomes sufficiently small, the learning is ended by regarding that the output signal from the output signal computing unit 1 has become sufficiently close to a desired value.

As described above, according to the fifth embodiment of the present invention, since the weight changing operation of the weight change quantity computing unit 12 is skipped when the errors of all the multi-input/single-output signal processing units in the highest hierarchy in the output signal computing unit 1 do not exceed the threshold value T3, not only the learning efficiency is improved, but also the amount of computation is greatly reduced, thereby reducing time necessary for performing the learning. In addition, by reducing the threshold value T3 as the learning advances, it is possible to make the output $o_k$ of the output signal computing unit 1 approach more closely the reference signal $t_k$, thereby improving the quality of the learning.

We claim:

1. An iterative learning machine comprising:
   an output signal computing means comprising:
   a plurality of multi-input/single-output signal processing means connected to form a network of a hierarchical structure such that said multi-input/single-output signal processing means in each hierarchy have no mutual coupling therebetween and signals propagate only in the direction of a higher hierarchy;
   a weight coefficient updating means for updating weight coefficients for said output signal computing means on the basis of an output signal therefrom;
   each said multi-input/single-output signal processing means comprising:
   memory means for storing a plurality of weight coefficients;
   a plurality of input means for receiving a plurality of data;
   multiplying means for weighting input data from said input means according to the weight coefficients stored in said memory means;
   adder means for adding together data weighted by said multiplying means;

threshold value processing means for limiting an output from said adder means to a value within a predetermined range;

said coefficient updating means comprising:

supervisory signal generator means for generating a signal reference value for an output signal from said output signal computing means;

error signal computing means for computing the difference between the output signal of said output signal computing means and said reference signal;

weight change quantity computing means for computing change quantities for weight coefficients stored in said memory, said computing being performed in accordance with an error output of said error signal computing means;

weight coefficient change quantity control means for controlling change quantities for said weight coefficients in accordance with an error output of said error signal computing means;

error signal determination means for ascertaining whether the output level of said error signal computing means exceeds a threshold value that is 2/3 the absolute value of a maximum error; and weight change quantity control means for multiplying weight coefficient change quantities in the highest hierarchy in said output signal computing means by a factor m, when said error signal determination means determines that an output value of said error signal computing means exceeds a threshold value.

2. An iterative learning machine comprising:

an output signal computing means comprising:

a plurality of multi-input/single-output signal processing means connected to form a network of a hierarchical structure such that said multi-input/single-output signal processing means in each hierarchy have no mutual coupling therebetween and signals propagate only in the direction of a higher hierarchy;

a weight coefficient updating means for updating weight coefficients for said output signal computing means on the basis of an output signal therefrom;

each said multi-input/single-output signal processing means comprising:

memory means for storing a plurality of weight coefficients;

a plurality of input means for receiving a plurality of data;

multiplying means for weighting input data from said input means according to the weight coefficients stored in said memory means;

adder means for adding together data weighted by said multiplying means;

threshold value processing means for limiting an output from said adder means to a value within a predetermined range;

said coefficient updating means comprising:

supervisory signal generator means for generating a signal reference value for an output signal from said output signal computing means;

error signal computing means for computing the difference between the output signal of said output signal computing means and said reference signal;

weight change quantity computing means for computing change quantities for weight coefficients stored in said memory, said computing being performed in accordance with an error output of said error signal computing means;

weight coefficient change quantity control means for controlling change quantities for said weight coefficients in accordance with an error output of said error signal computing means, said weight coefficient change quantity control means comprising:

error signal determination means for ascertaining whether the output of said error signal computing unit does not exceed a threshold value;

learning advancement determination means for determining the degree of advancement of learning on the basis of an output of said error signal computing unit;

threshold value control means for iteratively reducing said threshold value in accordance with the result of determination by said learning advancement determination means; and second weight change quantity control means for changing weight coefficient change quantities to zero whenever said error signal determination means determines that the error output of said error signal computing means does not exceed said threshold value.

3. A learning machine according to claim 2, wherein said learning advancement determination means determines the degree of advancement of learning in accordance with the total sum of errors of said multi-input/single-output signal processing means comprising the highest hierarchy in said output signal computing means.

4. A learning machine according to claim 2, wherein said learning advancement determination means determines the degree of advancement of learning in accordance with the number of iterations of learning.

5. A learning machine according to claim 2, wherein said learning advancement determination means determines the degree of advancement of learning in accordance with the number of multi-input/single-output signal processing means in the highest hierarchy in said output signal computing means whose output errors exceed said threshold value.

6. A learning machine according to claim 2, wherein said learning advancement determination means determines the degree of advancement of learning in accordance with a maximum output value produced by said error signal computing means in a single iteration of learning.

7. An iterative learning machine comprising:

an output signal computing means comprising:

a plurality of multi-input/single-output signal processing means connected to form a network of a hierarchical structure such that said multi-input/single-output a signal processing means in each hierarchy have no mutual coupling therebetween and signals propagate only in the direction of a higher hierarchy;

a weight coefficient updating means for updating weight coefficients for said output signal computing means on the basis of an output signal therefrom;

each said multi-input/single-output signal processing means comprising:

memory means for storing a plurality of weight coefficients;

a plurality of input means for receiving a plurality of data;

multiplying means for weighting input data from said input means according to the weight coefficients stored in said memory means;

adder means for adding together data weighted by said multiplying means;

threshold value processing means for limiting an output from said adder means to a value within a predetermined range;

said coefficient updating means comprising:

supervisory signal generator means for generating a signal reference value for an output signal from said output signal computing means;

error signal computing means for computing the difference between the output signal of said output signal computing means and said reference signal;

weight change quantity computing means for computing change quantities for weight coefficients stored in said memory, said computing being performed in accordance with an error output of said error signal computing means;

weight coefficient change quantity control means for controlling change quantities for said weight coefficients in accordance with an error output of said error signal computing means, said weight coefficient change quantity control means comprising:

error signal determination means for ascertaining whether the error output of said error signal computing means does not exceed a threshold value;

jump determination means for outputting a jump signal when, as a result of counting output signals from said error signal determination means, said jump determination means determines that the error output of said error signal computing means does not exceed said threshold value;

learning advancement determination means for determining the degree of advancement of learning based on the output of said error signal computing means;

threshold value control means for iteratively reducing said threshold value in accordance with the result of determination by said learning advancement determination means; and weight change quantity control means for skipping a weight changing operation of said weight change computing means in accordance with a jump signal outputted from said jump determination means.

8. A learning machine according to claim 7, wherein said learning advancement determination means determines the degree of advancement of learning in accordance with the total sum of errors of all said multi-input/single-output signal processing means comprising the highest hierarchy in said output signal computing means.

9. A learning machine according to claim 7, wherein said learning advancement determination means determines the degree of advancement of learning in accordance with the number of iterations of learning.

10. A learning machine according to claim 7, wherein said learning advancement determination means determines the degree of advancement of learning in accordance with the number of multi-input/single-output signal processing means in the highest hierarchy in said output signal computing means whose output errors exceed said threshold value.

11. A learning machine according to claim 7, wherein said learning advancement determination means determines the degree of advancement of learning in accordance with a maximum output value produced by said error signal computing means in a single iteration of learning.

* * * * *